United States Patent Office 3,420,740
Patented Jan. 7, 1969

3,420,740
DIGITALIS TETRAGLYCOSIDES AND
PRODUCTION THEREOF
Toshio Kawasaki, Fukuoka-shi, Japan, assignor to
Shionogi & Co., Ltd., Osaka, Japan
No Drawing. Continuation-in-part of application Ser. No.
370,667, May 27, 1964. This application Apr. 19, 1966,
Ser. No. 543,552
Claims priority, application Japan, May 30, 1963,
38/28,376
U.S. Cl. 195—2        12 Claims
Int. Cl. C12b *1/00*; C08b *19/00*

ABSTRACT OF THE DISCLOSURE

Non-cardiac spirostan tetraglycoside saponin from Digitalis leaves is prepared by a process which comprises the hydrolysis of the corresponding penta-, or higher, glycoside using certain glycoside hydrolyzing enzymes, examples of which are emulsin, glucosidase, amylase, hemicellulase and cellulase.

---

This application is a continuation-in-part of copending U.S. application Ser. No. 370,667 (now abandoned).

The present invention relates to a process for preparing a non-cardiac spirostan series tetraglycoside saponin or a mixture thereof from Digitalis leaves. More particularly it relates to an enzymatic production of the said spirostan series tetraglycosides.

The said enzymatic reaction concerns sugar degradation of the corresponding penta(or higher)glycosides to yield said tetraglycosides quite specifically, in high yield and in high purity. The said tetraglycoside or the mixture thereof can advantageously be used as a specific precipitation reagent, since it has more than 3 times higher potency in the precipitation reaction with a 3β-hydroxysteroid, especially cholesterol, when compared to the heretofore-applied digitonin which is a non-cardiac spirostan series pentaglycoside saponin from Digitalis seeds, or a commercially available mixture with minor components.

According to my study on the constitution of the waste liquor produced in the production of cardiac medicine, a cardenolide series aglycon or mono- to triglycoside saponin or the mixture thereof, from Digitalis leaves, it has been confirmed that the waste liquor comprised a small amount of said non-cardiac spirostan series tetraglycosides and large amount of the corresponding penta (or higher)glycosides having the same aglycons. The said tetraglycosides are novel and have been isolated for the first time by chromatography over alumina and assigned as:

Desgalactotigonin: M.P. 284 to 286° C. (decomp.)
F-gitonin: M.P. 252 to 255° C. (decomp.) having the structure:

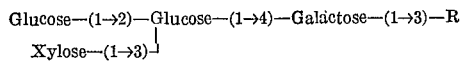

Glucose—(1→2)—Glucose—(1→4)—Galactose—(1→3)—R
            |
        Xylose—(1→3)

wherein R is tigogenin or gitogenin.

Further investigation has resulted in the conclusion that the said Digitalis tetraglycoside can accomplish quantitative precipitation (100% recovery) with as little as 7.5 times the amount of cholesterol, whereas the commercial digitonin requires more than 25 times the amount of cholesterol, as summarized in the following table.

| Commercial digitonin | | Digitalis tetraglycoside | |
|---|---|---|---|
| Dose (mg.) | Recovery (percent) | Dose (mg.) | Recovery (percent) |
| 5.0 | 100 | 1.00 | 100 |
| 2.5 | 100 | 0.75 | 100 |
| 1.25 | 95.0 | 0.63 | 99.0 |
| 1.00 | 90.7 | 0.50 | 96.6 |

Method of comparison: Add 1 ml. of solution of a measured amount of the saponin (commercial digitonin or Digitalis tetraglycoside) in an ethanol-water (1:1) mixture to 2 ml. of 0.05 mg./ml.-concentration solution of cholesterol (cholesterol amount is 0.1 mg.) in an acetone-ethanol (1:1) mixture, leave overnight, centrifuge and collect precipitate, wash the precipitate twice with ether-acetone (2:1) mixture and dry, dissolve the precipitate in 6 ml. of 0.08%-ferric chloride solution in glacial acetic acid while hot, cool and add 3 ml. of concentrated sulfuric acid slowly thereto, shake vigorously to develop the coloration, determine colorimetrically at 670 mμ after 30 minutes standing, and calculate the recovery ratio, according to so-called Zak-Henly's method.

Further investigation has revealed that the said tetraglycoside can be obtained from the corresponding penta (or higher)glycoside which is obtained from the waste liquor from Digitalis leaves and has the same aglycon by enzymatic degradation method in quantitative aspect.

It should be noted that the resultant tetraglycoside is not further hydrolyzed in the said enzymatic degradation reaction medium. It is also notable that the penta(or higher)glycoside component in Digitalis seed does not yield the corresponding tetraglycoside but gives always various lower degradation products which no longer show precipitation activity against cholesterol.

According to the process of the present invention, the said non-cardiac spirostan series tetraglycoside or a mixture thereof is obtainable by treating a non-cardiac saponin-containing material with a digestive enzyme preparation or a mixture thereof, with or without previous elimination of the said tetraglycosides by a conventional separation technique such as chromatography.

It is a basic object of the present invention to provide a non-cardiac spirostan series tetraglycoside saponin, especially desgalactotigonin or F-gitonin, or a mixture thereof advantageously in industrial scale. Another object is to provide an excellent specific precipitating agent for 3β-hydroxysteroid, especially cholesterol, with technical advantage. Another object is to utilize the waste liquor resulting from the production of cardiac remedy from Digitalis leaves. A further object is to obtain a specific enzymatical terminal sugar degradation with so-called digestive enzyme preparation. A further object is to obtain a high yield conversion of the corresponding penta (or higher)glycoside into the said tetraglycoside. A further object is to obtain a pure specimen of the said tetraglycosides. These and other objects will be apparent to those skilled in the art to which the present invention pertains from the subsequent description.

The starting material is a non-cardiac Digitalis leaf saponin preparation so far as it comprises the corresponding penta(or higher)glycoside. Preferable examples are waste liquor obtained after recovery of so-called cardiac cardenolide series glycosides from the extract of the leaves of Digitalis plant (e.g. *Digitalis purpurea, D. lanata, D. germanicum*) or a preparation thereof. The term "preparation" as used in "Preparation 1–5" below means a substance obtained from the waste liquor after pretreatment for removing impurities or additionally, the removal of the said tetraglycoside components. As the digestive enzyme preparation a commercially or non-commercially available pure or impure preparation can be used so far as it consists solely or mainly of a hetero-, oligo- or polyglycoside hydrolyzing enzyme specimen or a mixture thereof. Examples of the enzyme specimen are emulsin, glucosidase, amylase, hemicellulase, cellulase, etc., which are obtainable according to the well-known procedure from various origins e.g. microbials, plants, digestive organs of animals, etc. As to the consideration of variety of the cleaved sugar residues and linkages thereof the said penta (or higher) glycosides, a preparation which comprises more than one type of the said glycosidases is rather advantageous.

The treatment may be effected by combining the starting material with the said glycosidase preparation in a ratio about 100:1 to 1:10 in an aqueous reaction medium such as water or an aqueous mixture of an enzymatically acceptable organic solvent such as a water-miscible lower alkanol and allowing the resultant mixture to stand at an optimal reaction temperature for the enzyme used, usually at about 10 to 50° C., for a reaction period about 1 to 10 days. As the water-miscible lower alkanol, methanol, ethanol, propanol can be used and, more particularly, ethanol is preferable. The preferable concentration of the said lower alkanol is 0 to 50%, more particularly 10 to 40%. The reaction medium can preferably contain 0 to 0.5%-amount of an antiseptic and an appropriate amount of a pH-regulating agent to adjust the pH of the reaction medium to the optimal point for the enzyme in a range 4.0 to 9.0. As the antiseptic, an aromatic hydrocarbon such as benzene, toluene or the like, a halogenated aliphatic lower hydrocarbon such as chloroform or the like, or an organic antiseptic selected from the series consisting of benzoic acid, p-hydroxybenzoic acid, salicylic acid, sorbic acid, dehydroacetic acid, or alkali metal salts or lower alkyl esters thereof can be used. As the pH-regulating agent, an organic or inorganic acid such as acetic acid, hydrochloric acid, phosphoric acid or the like, a conventional buffer composition such as acetate buffer, phosphate buffer or the like can be used.

The recovered step comprises collecting the crude product produced in the reaction mixture by a method selected from filtration, centrifugation, and extraction with a water-immiscible lower alkanol or a mixture of a lower alkanol and a halogenated aliphatic lower hydrocarbon. Filtration is effected preferably with previous dilution with water when the concentration of the employed lower alkanol in the reaction mixture is relatively high. Centrifugation is more effectively carried out with addition of ether which promotes aggregation of the precipitation. As the said water-immiscible lower alkanol, an aliphatic alcohol having 3 to 6 carbon atoms, especially butanol, is preferable. As the mixture of a lower alkanol and a halogenated aliphatic lower hydrocarbon, a mixture of a lower alkanol having 1 to 6, more preferably methanol, and a halogenated aliphatic lower hydrocarbon having 1 to 3 carbon atoms, more preferably chloroform or dichloromethane, is used.

The thus obtained product is a mixture of the said non-cardiac spirostan series tetraglycoside saponins mainly or, when relatively pure starting material is applied, almost solely consisting of the compound represented by the formula:

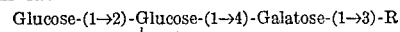
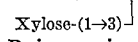

wherein R is a spirostan series sapogenin such as tigogenin, gitogenin or the like. The mixture can satisfactorily be applicable for the above-mentioned object, utilization for determination of cholesterol or other 3β-hydroxysteroids, but can be purified to yield respective tetraglycoside specimen in the said recovery step.

The said purification in the recovery step can be carried out by a method selected from crystallization from a lower alkanol, an aqueous lower alkanol or a mixture of a lower alkanol and a halogenated aliphatic lower hydrocarbon, a chromatography over cellulose powder previously impregnated with acetone containing small amount of formamide, preferably 10 to 20%, with elution solvent system consisting of preferably about 10 parts of chloroform, preferably 10 parts of tetrahydrofuran, preferably 2 parts of pyridine and preferably 3 to 4 parts of formamide, and a combination of the two methods. In the purification methods, the said lower alkanol may be selected from methanol, ethanol, propanol, butanol and pentanol, and the halogenated aliphatic lower hydrocarbon may be selected from chloroform, dichloromethane and dichloroethane.

The resultant tetraglycoside specimen of which the structure is mentioned above is a very superior specific precipitation reagent for chloesterol for strict determination procedure because it has constant critical physical characteristics such as melting point, UV-absorption spectrum, etc. and therefore can be quite easily guaranteed for purity.

Since there can be obtained only a slight amount of the said tetraglycosides by simple isolation techniques from the leaf saponin material, the present invention embodies for the first time a practically available production method of the said non-cardiac tetraglycosides.

The said tetraglycoside or a mixture thereof prepared by the present process is excellent as the specific precipitation reagent for 3β-hydroxysterods, especially cholesterol, since it is more than 3 times as sensitive as the heretofore available digitonin. Moreover, the tetraglycoside product has a significant advantage since it exhibits no absorption band neighbouring at 570 mµ, whereas digitonin exhibits such coloration and therefore results in an inevitable error in the spectrometry of cholesterol such as Zak-Henly's method.

The following preparations and examples set forth illustratively presently preferred embodiments of the present invention.

PREPARATION 1

After harvest, the leaves of Digitalis purpurea are dried as quickly as possible by blowing air of 60° C. The dried leaves (1 part by weight) are extracted twice with 50%-aqueous methanol (1500 parts by weight) at 30° C. To the extract, there is added a solution of monobasic lead acetate in water, and the precipitate is eliminated by filtration. Then, hydrogen sulfide is passed through the filtrate, and the precipitate is removed by filtration. The filtrate is neutralized and concentrated under reduced pressure to about one third volume. The separated substance (cardiac cardenolide series glycosides) is removed by suctional filtration. The filtrate is shaken with ether and then chloroform to remove impurities. The water layer is shaken with water-saturated butanol. The butanol layer is evaporated under reduced pressure to give an amorphous substance (crude mixture containing non-cardiac spirostan series leaf saponins).

PREPARATION 2

The amorphous butanol extract (50 g.) is dissolved in methanol (700 ml.) and combined with active charcoal (10 g.). The resultant mixture is heated for 30 minutes while refluxing and then filtered. The filtrate is concentrated under reduced pressure to give hygroscopic brown powder (48 g.).

PREPARATION 3

The brown powder (45 g.) is washed with chloroform (200 ml.) and dissolved in 90%-aqueous ethanol (500 ml.). To the resultant solution, there is added a solution of cholesterol (10 g.) in 99%-aqueous ethanol (150 ml.). The resulting mixture is heated on a water bath for a while and allowed to stand in a refrigerator overnight. The separated cholesteride is collected by filtration, washed with ethanol and ether in order and dried. The dried cholesteride (23 g.) is dissolved in anhydrous pyridine, and ether is added thereto. The precipitate is collected by filtration, washed with ether and dried to give the crude leaf saponin fraction (16 g.).

PREPARATION 4

The crude leaf saponin fraction (15 g.) is extracted with a mixture of chloroform and methanol (1:1) while hot. The extract is concentrated under reduced pressure. The residue is dissolved in methanol and treated with active charcoal. After removal of the active charcoal by filtration, the filtrate is concentrated under reduced pressure to dryness whereby the pure leaf saponin fraction (12.5 g.) is obtained as powder.

PREPARATION 5

The pure leaf saponin fraction (1 part by weight) is dissolved in a mixture of chloroform and methanol (1:1) and poured onto a column of alumina (100 parts by volume). The column is treated with chloroform-methanol (1:1) mixture, methanol and water-saturated butanol in order. Front eluates are combined together and the solvent is evaporated to give the tetraglycoside mixture. Rear eluates are combined together and the solvent is evaporated to give the penta (or higher) glycoside mixture.

Example 1

The penta(or higher)glycoside mixture (2 g.) obtained in the above Preparation 5 is dissolved in 20%-aqueous ethanol (500 ml.). To the resultant solution, there are added an amylase preparation (from *Aspergillus oryzae*, containing minor components cellulase, maltase, etc.) (4 g.), glacial acetic acid (0.2 ml.) and toluene (0.3 ml.), and the resulting mixture is allowed to stand at 30° C. for 7 days. The separated substance is collected by filtration, dried and extracted with a mixture of chloroform and methanol (1:1). The extract is concentrated under reduced pressure. The precipitate is collected by filtration and dried to give the tetraglycoside mixture (930 mg.) mainly consisting of desgalactotigonin and F-gitonin.

Example 2

The tetraglycoside mixture obtained in the above Example 1 is chromatographed over cellulose powder impregnated with acetone containing 15%-formamide and dried. By eluting with a solvent system, chloroform-tetrahydrofuran-pyridine-formamide (10:10:2:3–4), there are separatedly obtained desgalactotigonin and F-gitonin.

Desgalactotigonin: microcrystalline powder melting at 284 to 286° C. (decomp.)(crystallized from a mixture of chloroform and methanol); $[\alpha]_D^{28}$ −64.0° (c.=0.50, in pyridine).

*Analysis.*—Calcd. for $C_{50}H_{82}O_{22}.2H_2O$: C, 56.06; H, 8.09. Found: C, 56.38; H, 8.57.

When heated in a mixture of 1 N hydrochloric acid and dioxane (3:1) for 3 hours, there are produced four substances which are identified with tigogenin, D-glucose, D-galactose and D-xylose in molar ratio 1:2:1:1.

F-gitonin: colorless needles melting at 252 to 255° C. (decomp.) (crystallized from water-saturated butanol); $[\alpha]_D^{25}$ −58.5° (c.=0.53, in pyridine).

*Analysis.*—Calcd. for $C_{50}H_{82}O_{23}.2H_2O$: C, 55.23; H, 7.97. Found: C, 55.63; H, 8.25.

When heated in a mixture of 1 N-hydrochloric acid and dioxane (3:1) for 3 hours, there are produced four substances which are identified respectively with gitogenin, D-glucose, D-galactose and D-xylose in molar ratio 1:2:1:1.

Example 3

The pure leaf saponin fraction (10 g.) obtained in the above Preparation 4 is dissolved in 20%-aqueous ethanol (3 liters). To the resultant solution, there are added a commercial hemicellulase preparation (containing xylosidase, naringinase, hesperidinase, etc.) (20 g.), glacial acetic acid (3 ml.) and toluene (2 ml.), and the resulting mixture is allowed to stand at 30° C. for 8 days. After addition of water (1 liter), the precipitate is collected by filtration and crystallized from a mixture of chloroform and methanol to give the tetraglycoside mixture (5.3 g.) as microcrystalline powder. From the above filtrate, the tetraglycoside mixture (2 g.) is further recovered by extraction with butanol. These tetraglycoside mixtures are combined together and recrystallized from 70%-aqueous ethanol and then water-saturated butanol to give colorless needles (6.2 g.) melting at 246 to 252° C. (decomp.). The needles consist of 6% of desgalactotigonin and 94% of F-gitonin. When the needles are recrystallized from water-saturated butanol eight times, there are obtained pure crystals of F-gitonin.

Example 4

Each 50 mg. of the penta(or more)glycoside mixture prepared in the Preparation 5 is subjected to the enzymic degradation with four kinds of enzyme preparation in similar manner as in the above Example 1. The respective reaction mixtures are diluted with water, extracted with butanol. The extracts are evaporated and examined by the conventional paper chromatography. The results are summarized in the following table, which shows tetraglycoside formation by loss of glycoside moiety.

| Experiment No. | 1 | 2 | 3 | 4 |
|---|---|---|---|---|
| Solvent (percent EtOH) | 30 | 30 | 20 | 20 |
| Solvent (ml.) | 100 | 100 | 50 | 50 |
| Acetic acid, glacial (ml.) | 0.2 | | 0.1 | 0.1 |
| Enzyme preparation | (1) | (2) | (3) | (4) |
| Enzyme preparation (mg.) | 500 | 200 | 100 | 100 |
| Reaction period (day) | 5 | 5 | 7 | 7 |
| Temp. (° C.) | 25 | 25 | 25 | 30 |
| Tetraglycoside | + | + | + | + |
| Pentaglycoside | ± | − | − | − |
| Glucose | + | + | + | + |
| Galactose | − | − | − | − |

[1] Emulsion prepared from apricot seeds, containing glucosidase, galactosidase, arabinosidase, mannosidase, etc.
[2] Snail enzyme prepared from *Euhadra quaesita*, containing esterase, glucuronidase, galactosidase, sulfatase, etc.
[3] Hemicellulase prepared from an Aspergillus sp., containing xylosidase, naringinase, hesperidinase, etc.
[4] Amylase prepared from *Aspergillus oryzae*, containing cellulase maltase, etc.

Example 5

The brown powder (2 g.) obtained in the above Preparation 2 is dissolved in water (200 ml.). To the resultant solution, there is added amylase (2.0 g.), and the resulting mixture is allowed to stand at 37±2° C. for 4 days. The precipitate is collected by filtration, washed with water, dried and extracted with a mixture of chloroform and methanol (1:1). By evaporation of the solvent from the extract, there is obtained yellowish brown powder (500 mg.), which is crystallized from aqueous methanol and then anhydrous methanol to give the tetraglycoside mixture (200 mg., melting at 256 to 258° C., decomp.) consisting of 40% of desgalactotigonin and 60% of F-gitonin as white microcrystalline powder.

Example 6

The brown powder (2 g.) obtained in Preparation 2 is dissolved in water (200 ml.), and amylase (0.5 g.) is added thereto. The resulting mixture is allowed to stand at 35° C. for 4 days. The precipitate is collected by filtration, dried and extracted with a mixture of chloroform and methanol. The extract is treated as in Example 5 to give the brown powder (tetraglycoside mixture) (540 mg.).

Example 7

F-gitonin (2 g.) is dissolved in 50%-ethanolic 1 N-hydrochloric acid (200 ml.) and refluxed for 1 hour. The precipitate is collected by filtration and chromatographed on alumina (30 g.). The alumina is eluted with chloroform-methanol (30:1–1:1) and aqueous butanol whereby gitogenin (200 mg.), monoglycoside (30 mg.), a mixture (20 mg.) of monoglycoside and diglycoside, a mixture (50 mg.) of monoglycoside, diglycoside and triglycoside, a mixture (170 mg.) of diglycoside and triglycoside, triglycoside (300 mg.) and a mixture (100 mg.) of triglycoside and F-gitonin are obtained in succession.

The monoglycoside (prisms from methanol; M.P., 253 to 255° C., decomp.) affords gitogenin and D-galactose by hydrolysis. The triglycoside (granular crystals from water-saturated butanol; M.P., 225 to 230° C., decomp.) affords 2 moles of glucose and 1 mole of galactose by acid hydrolysis. The triglycoside is not hydrolyzed with the enzyme preparation such as amylase or emulsin.

The triglycoside is completely methylated with methyl iodide and silver oxide in dimethylformamide according to Kuhn's method. The resulting methylated compound (250 mg.) is refluxed in methanolic hydrochloric acid, followed by hydrolysis with hot hydrochloric acid to give methylgitogenin (70 mg., prisms; M.P., 220 to 222° C.; $[\alpha]_D^{11}$ −94.1° (c.=2.02 in chloroform)) and a mixture of (120 mg.) of methylsugars. The mixture of methylsugars is chromatographed on cellulose powder and eluted with hexane-butanol (3:2) saturated with water to give 2,3,4,6-tetra-O-methyl-D-glucopyranose (needles, M.P., 88 to 94° C.), 2,3,6-tri-O-methyl-D-galactopyranose (characterized by oxidation product; 2,3,6-tri-O-methyl-D-galactofuranolactone; needles, M.P., 98 to 100° C.) and 3,4,6-tri-O-methyl-D-glucopyranose. Thus, the triglycoside is assigned the following structure:

Glucose-(1→2)-Glucose-(1→4)-Galactose-(1→3)-Gitogenin

F-gitonin (2 g.) is completely methylated, subjected to methanolysis and hydrolyzed with hydrochloric acid in the same manner as above to give methylgitogenin (390 mg.) and a mixture (600 mg.) of methylsugars. The mixture of methylsugars is chromatographed on cellulose powder and eluted with hexane-butanol (3:2) saturated with water. The first fraction (250 mg.) is repeatedly chromatographed on carbon-infusorial earth and eluted with 5%-aqueous solution of butan-2-one; the second fraction affords 2,3,4-tri-O-methyl-D-xylopyranose (prisms from hexane: M.P., 88 to 90° C.; $[\alpha]_D^{11}$ +53.7→18.8° (c.= 1.86 in water)) and the fourth fraction gives 2,3,4,6-tetra-O-methyl-D-glucopyranose (needles from hexane; M.P., 88 to 94° C.; $[\alpha]_D^{13}$ +89.8°→+85.2° (c.=1.96 in water)). The third fraction (130 mg.) of the first cellulose-chromatography is oxidized with bromine in water, purified with strong cation exchange resin of sulfonic acid type and crystallized from a mixture of ether and hexane to give 2,3,6-tri-O-methyl-D-galactofuranolactone (needles; M.P., 98 to 100° C.; $[\alpha]_D^{18}$ −27.0° (c.=0.74 in chloroform)). This suggests that the original third fraction contains 2,3,6-tri-O-methyl-D-galactopyranose. The fifth fraction is crystallized from ethyl acetate to give 4,6-di-O-methyl-D-glucopyranose (needles; M.P., 158 to 162° C.; $[\alpha]_D^{25}$ +132→+77.6° (c.=2.12 in water)). Thus, F-gitonin is assigned the following structure:

Glucose-(1→2)-Glucose-(1→4)-Galactose-(1→3)-Gitogenin
                Xylose-(1→3)─┘

Example 8

The brown powder (1 g.) obtained in the above Preparation 2 is dissolved in water (300 ml.), and an amylase preparation (from *Asperigillus niger*, containing cellulase, protease, lipase, phosphatase, etc.) (2 g.) is added thereto. The resultant mixture is allowed to stand at 37° C. for 6 days. The precipitate is collected by filtration, dried and extracted with a mixture of chloroform and methanol. The extract is evaporated to yield brown powder (tetraglycoside mixture, 210 mg.).

Example 9

The pentaglycoside fraction (1.0 g.) obtained in the above Preparation 5 is dissolved in acetate buffer solution of the pH 4.5 (200 ml.), and a cellulase preparation (from *Trichoderma koningi*, containing cellobiase, xylanase, amylase, etc.) (2.0 g.) is added thereto. The resulting mixture is allowed to stand at about 40° C. for 4 days with slow stirring. The reaction mixture is, after addition of ether, centrifugated to collect the precipitate, which is treated in a similar manner to Example 8 to yield slight brownish-grayish white powder (tetraglycoside mixture, 0.73 g.).

Example 10

The brown powder (10 g.) obtained in the above Preparation 2 is dissolved in water (1 liter), and the same enzyme as used in Example 9 (2.0 g.) is added thereto. The resultant mixture is allowed to stand at 37±2° C. for 4 days and thereafter treated in a similar manner to Example 9 to yield brown powder (tetraglycoside mixture, 2.634 g.).

What is claimed is:

1. A process for preparing non-cardiac spirostan series tetraglycoside saponin from Digitalis leaves which comprises hydrolyzing corresponding penta or higher glycoside extracted from said leaves with a digestive enzyme preparation in an amount of about one hundredth-fold to ten-fold the amount of starting material, in an aqueous reaction medium at a reaction temperature of about 10° to 50° C. for a reaction period of about 1 to 10 days and recovering produced tetraglycoside saponin, the said digestive enzyme preparation consisting essentially of a hetero-, oligo- or polyglycoside hydrolyzing enzyme selected from the group consisting of emulsin, glucosidase, amylase, hemicellulase, cellulase and a mixture thereof.

2. A process according to claim 1, wherein the said aqueous reaction medium comprises 0 to 50% of a water-miscible lower alkanol.

3. A process according to claim 1, wherein the said recovering step comprises purifying the crude product by crystallization from a lower alkanol, an aqueous lower alkanol or a mixture of a lower alkanol and a halogenated aliphatic lower hydrocarbon, chromatography over cellulose powder previously impregnated with formamide-containing acetone with an elution solvent system consisting of chloroform, tetrahydrofuran, pyridine and formamide, or a combination thereof, thus obtaining the respective non-cardiac spirostan series tetraglycoside saponins.

4. A process for preparing non-cardiac spirostan series tetraglycoside saponin from Digitalis leaves which comprises hydrolyzing corresponding penta or higher glycoside, extracted from said leaves, with a digestive enzyme preparation consisting essentially of enzymes selected from the group of emulsin, glucosidase, amylase, hemicellulase and cellulase in an amount of about one hundredth-fold to ten-fold the amount of starting material in an aqueous reaction medium selected from the group consisting of 0 to 50% aqueous water-miscible lower alkanol, 0 to 50% aqueous water-miscible lower alkanol containing to 0 to 0.5% of an antiseptic, and 0 to 50% aqueous water-miscible lower alkanol of a pH of about 4.0 to 9.0 containing an effective amount of a pH-regulating agent and 0 to 0.5% of an antiseptic, at a reaction temperature of about 10 to 50° C. for a reaction period of about 1 to 10 days and recovering tetraglycoside saponin product.

5. A process according to claim 1 wherein the said Digitalis leaves are leaves of *Digitalis purpurea*.

6. A process according to claim 1, wherein the said non-cardiac spirostan series tetraglycoside saponin is desgalactotigonin or F-gitonin.

7. A process claimed in claim 4, wherein the recovering step comprises collecting the crude product by filtration with previous dilution of the reaction mixture with water.

8. A process claimed in claim 4, wherein the recovering step comprises collecting the crude product by centrifugation with addition of ether.

9. A process claimed in claim 4, wherein the recovering step comprises extraction of the crude product with water-immiscible lower alkanol or mixture of lower alkanol and halogenated aliphatic lower hydrocarbon mixture.

10. A process claimed in claim 4, wherein the water-miscible lower alkanol in the said reaction medium is ethanol.

11. A process for preparing non-cardiac spirostan series tetraglycoside saponin of the formula:

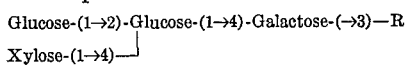

wherein R is tigogenin or gitogenin from Digitalis leaves which comprises hydrolyzing a corresponding penta or higher glycoside, extracted from the group consisting of emulsin, glucosidase, amylase, hemicellulase and cellulase in an amount of about one hundredth-fold to ten-fold the amount of the starting material in an aqueous reaction medium consisting of 0 to 50% ethanol, 0 to 50% ethanol containing 0 to 0.5% of an antiseptic selected from the group consisting of an aromatic hydrocarbon, a halogenated aliphatic lower hydrocarbon, and, an organic antiseptic, benzoic acid, p-hydroxybenzoic acid, salicylic acid, sorbic acid, dehydroacetic acid or alkali metal salts or lower alkyl esters thereof, and 0 to 50% ethanol of a pH of about 4.0 to 9.0 containing an effective amount of a pH-regulating agent in the form of an organic or inorganic acid or a buffer composition thereof, and 0 to 0.5% amount of the said antiseptic, at a reaction temperature of about 10 to 50° C. for a reaction period of about 1 to 10 days, and recovering the tetraglycoside saponin.

12. A process claimed in claim 11, wherein the said non-cardiac spirostan series tetraglycoside saponin of the formula:

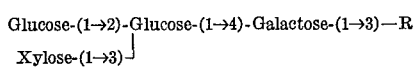

is desgalactotigonin or F-gitonin.

References Cited
UNITED STATES PATENTS
2,069,687    2/1937    Stoll et al.
2,784,144    3/1957    Krider et al. _____ 195—32

ALVIN E. TANENHOLTZ, *Primary Examiner.*

U.S. Cl. X.R.

195—32, 62; 260—210.5; 23—230